(12) United States Patent
Oriols Gaja et al.

(10) Patent No.: US 10,858,205 B2
(45) Date of Patent: Dec. 8, 2020

(54) AUTOMATED CONTAINER-EMPTYING DEVICE EQUIPPED WITH MEANS FOR COLLECTING AND GRAVITY-EMPTYING CONTAINERS AND COMPRISING A PRODUCT COLLECTION ZONE

(71) Applicant: GRIFOLS WORLDWIDE OPERATIONS LIMITED, Dublin (IE)

(72) Inventors: Joan Oriols Gaja, Barcelona (ES); Daniel Fleta Coit, Barcelona (ES); Jose Luis Gomez Flores, Barcelona (ES)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 17 days.

(21) Appl. No.: 16/156,914

(22) Filed: Oct. 10, 2018

(65) Prior Publication Data
US 2019/0119050 A1    Apr. 25, 2019

(30) Foreign Application Priority Data
Oct. 24, 2017   (EP) .................................... 17382714

(51) Int. Cl.
*B65G 65/00*     (2006.01)
*A61J 1/16*      (2006.01)
(Continued)

(52) U.S. Cl.
CPC .............. *B65G 65/005* (2013.01); *A61J 1/16* (2013.01); *A61J 1/165* (2013.01); *B65B 69/00* (2013.01); *B65G 65/23* (2013.01)

(58) Field of Classification Search
CPC ...... B65G 65/005; B65G 65/23; B65B 69/00; B65B 69/0008; A61J 1/165; A61J 1/16; A61J 1/14; B67C 9/00
See application file for complete search history.

(56) References Cited

U.S. PATENT DOCUMENTS

| 4,399,847 A * | 8/1983 | McRoberts ............... B65B 3/06 |
| | | 141/364 |
| 2003/0155452 A1* | 8/2003 | Herget ................ B65B 69/0083 |
| | | 239/650 |

(Continued)

FOREIGN PATENT DOCUMENTS

CL    201802902 A1    11/2018
ES      2245836 A1     1/2006
(Continued)

OTHER PUBLICATIONS

Search Report of corresponding Chilean Patent Application No. 2018-02939—9 pages (dated Jun. 17, 2019).
(Continued)

*Primary Examiner* — Craig M Schneider
*Assistant Examiner* — Jason K Niesz
(74) *Attorney, Agent, or Firm* — Knobbe, Martens, Olson & Bear, LLP (57) ABSTRACT

Disclosed is an automatic container-emptying device. The device is equipped with means for collecting and gravity-emptying containers and comprising a product collection zone. The device includes a dripper equipped with at least one element for supporting upside down containers. The dripper has two operating positions: a first positon for holding the containers to allow the product to drip onto the product collection zone and a second positon for ejecting said containers.

15 Claims, 11 Drawing Sheets

(51) Int. Cl.
  *B65B 69/00* (2006.01)
  *B65G 65/23* (2006.01)

(56) References Cited

U.S. PATENT DOCUMENTS

| 2004/0099690 | A1 | | 5/2004 | Elliott et al. | |
|---|---|---|---|---|---|
| 2007/0069087 | A1 | * | 3/2007 | Mumm | B25J 9/046 |
| | | | | | 248/176.1 |

FOREIGN PATENT DOCUMENTS

| JP | S61-110352 U | 7/1986 |
|---|---|---|
| JP | 3-30338 Y2 | 6/1991 |
| JP | H6-72801 U | 10/1994 |

OTHER PUBLICATIONS

Extended European Search Report of corresponding Patent Application No. 17382714.8—8 pages (dated Mar. 28, 2018).
Office Action of corresponding Japanese Patent Application No. 2018-167707—12 pages (dated Dec. 23, 2019).

\* cited by examiner

AUTOMATED CONTAINER-EMPTYING DEVICE EQUIPPED WITH MEANS FOR COLLECTING AND GRAVITY-EMPTYING CONTAINERS AND COMPRISING A PRODUCT COLLECTION ZONE

BACKGROUND

Technical Field

The present application discloses an automatically operating device intended for emptying blood product containers.

Blood product bottles obtained from donors are received at pharmaceutical laboratories specialising in products derived from blood. Said blood product arrives frozen in order to keep it in an optimal state of preservation. Said frozen blood product must be extracted from the bottles in order to be able to carry out the necessary operations such that said product can be used in pharmaceutical applications.

Currently, in the most advanced laboratories, this process of extracting frozen blood product from the respective bottles is carried out automatically. One problem with the frozen blood product is that, owing to the physical properties thereof, extraction of the frozen product has to be done over a long period of time, which creates lapses in time in which the emptying device is simply waiting for the bottle or bottles to finish emptying. If said process is accelerated, there is the risk of wasting blood product, which is expensive and in short supply.

Related Art

Document US 2007/0069087 A1 "Device for lifting and rotating containers" discloses a device for transporting and emptying containers containing small objects (for example, syringe plungers, vials for pharmaceutical purposes, etc.), liquids or powders in a clean or aseptic room, said device being composed of an articulated arm connected to a support column. Said articulated arm picks up the container in a receiving zone and places said container in a rapid transfer port located in an emptying station. Said device has the drawback that it is not intended for emptying frozen product, and if said device were used to empty a product of this kind, the articulated arm would have to spend a considerable amount of time with the container upside down, waiting for the container to fully empty, which would render the process highly inefficient. Moreover, said device can only empty one container per operating cycle, it is not designed to empty a plurality of containers simultaneously.

A related art is disclosed in document ES 2245836 A1 "Procedimiento y aparato para el vaciado de recipientes de plasma sanguineo" (Method and apparatus for emptying blood plasma containers). Said document discloses a method and an apparatus for emptying bottles containing blood plasma in an entirely automated manner. The process starts with a phase of washing, rinsing and drying the outside of the filled bottles using water spray and clean air. Next, a batch of filled recipients is formed such that the upper ends thereof can later be cut simultaneously.

Subsequently, a robotic arm equipped with a special holding tool grips the batch of cut bottles and positions them above a funnel for collecting blood product. Once the bottles are above said funnel, the robotic arm inverts the bottles and the blood product falls into said collecting funnel by the force of gravity. One problem with this method is that the robot must remain for a time with the bottles upside down, waiting for said bottles to finish emptying, if it is desired for the bottles to be emptied completely before they are disposed of. The process of emptying bottles containing frozen blood product is a process that is carried out in an uninterrupted manner, and this short period of time in which the robot waits for the bottles to finish emptying, over time, adds up to a significant waste of time, and therefore, to considerable economic loss. If it is desired to shorten the time the robot spends waiting for the bottles to finish emptying, there is the risk that the bottles are disposed of when there is still blood product inside. Not waiting for the container to empty fully entails significant economic loss on account of wasted blood product and also increases the risk of contamination.

SUMMARY

An aspect of the present invention aims to overcome the inefficiencies of current processes for extracting frozen blood product.

An aspect of the present invention solves this problem by adding a dripper which comprises a plurality of support elements for blood product bottles. Said dripper has two operating positions, in the first of which said dripper holds the various blood product bottles upside down such that the contents of the bottle drain into the funnel for collecting blood product, whereas in the second position, said dripper rotates until it reaches a position in which the bottles fall from the support elements by the force of gravity into a funnel for supplying a used-container crusher.

By means of said dripper, the robotic arm, instead of waiting for the blood product bottles to finish emptying, leaves the bottles to drain on said dripper once initial emptying of the containers is complete, and in this way, the arm can then fetch the next batch of bottles while the blood product containers finish emptying. Before the robot carries out the first bottle emptying operation, the dripper drops said bottles, now completely empty, into the funnel for supplying the container crusher and returns to the holding position to wait for the robot to deposit the bottles onto the corresponding support rods such that said bottles finish emptying.

Consequently, the present application discloses an automated container-emptying device equipped with means for collecting and gravity-emptying containers and comprising a product collection zone as well as a dripper equipped with at least one element for supporting upside down containers; said dripper additionally having two operating positions: a first for holding the containers to allow the product to drip onto the product collection zone and a second for ejecting said containers.

One advantage according to a certain embodiment of the present invention is that integrating a dripper into an automated device for emptying blood product containers, which dripper operates in conjunction with the remaining elements that make up said automated container-emptying device, greatly increases the productivity of said device. In addition, said dripper is designed and actuated so as to allow easy cleaning and decontamination thereof. Owing to the high level of asepsis required by the product to be extracted, this is especially important.

Preferably, the present automated container-emptying device is an automated device for emptying blood product. More advantageously, said blood product is frozen. Preferably, said containers are bottles.

In one embodiment of the invention, the dripper is formed by a longitudinal shaft which comprises at least one support element. Preferably, the at least one support element is a rod. Advantageously, the plurality of support rods are on the same plane perpendicular to the longitudinal shaft. In the holding position of the dripper, at least one support element is pointing upwards from a horizontal shaft of the dripper, such that the at least one support element can hold at least one blood product bottle upside down.

In one embodiment of the invention, a rotary module actuates the dripper. In a preferred embodiment of the invention, said rotary module comprises pneumatic actuation means.

In one embodiment of the invention, at one of its ends, the shaft comprises a cotter pin which fits into a cotter hole in a circular actuation plate. Said circular actuation plate is responsible for ultimately transmitting the movement of the rotary module to the longitudinal shaft and to the corresponding plurality of support rods thereof.

In a preferred embodiment of the invention, the shaft comprises four support rods. Preferably, the plurality of bottles consists of four blood product containers.

In one embodiment of the invention, on the end opposite the cotter pin and the actuation plate, the shaft is inserted into a pivot bush which acts as a support point for the shaft and the plurality of support rods and, at the same time, facilitates rotation thereof. Said pivot bush in turn fits into a support plate which, together with its twin, which fits with the circular disc, are responsible for supporting the dripper as a whole.

In one embodiment of the invention, the circular actuation plate is housed inside the disc. Said circular actuation plate is coupled to the output shaft of the rotary module by the end thereof opposite to that of the cotter hole.

In one embodiment of the invention, a scraper is positioned between the circular actuation plate and the hole in the disc in which said plate is housed, which scraper is responsible for preventing the blood product from coming into contact with the rotary module.

In one embodiment of the invention, the rotary module is located inside a cylindrical housing. Said cylindrical housing is connected to the disc by non-permanent connection means. Preferably, said non-permanent connection means are screws.

In one embodiment of the invention, a bush is positioned between the cylindrical housing and the disc, which bush is preferably made of teflon and is responsible for making the closure liquid-tight.

In one embodiment of the invention, there are means for coordinating the dripper with the means for collecting and gravity-emptying containers. Preferably, said means for collecting and gravity-emptying containers comprise a robotic arm. Even more preferably, said robotic arm comprises a special tool for simultaneously gripping a plurality of blood product bottles.

In one embodiment of the invention, the dripper is located close to one of the ends of a funnel for collecting blood product and on a higher plane than said funnel. In one embodiment of the invention, a funnel for supplying a used-container crusher is positioned at the end opposite the funnel for collecting blood product.

In one embodiment, the dripper has two operating positions. The first position of the dripper is that of holding the plurality of containers, while the second is that of ejecting said plurality of containers. In the first position, the plurality of support rods is slightly inclined with respect to the vertical towards the side on which the funnel for collecting blood product is located, such that when the means for collecting and gravity-emptying the containers leave the containers upside down on the respective support rods thereof, any plasma that remains inside the bottles drains out towards the funnel for collecting blood product. Said ejection position of the dripper is such that the used containers are caused to fall, by the force of gravity, into a funnel for receiving used containers. In said second operating position, the shaft, together with the plurality of support rods, rotates towards the outside of the funnel for collecting blood product until it reaches a position in which the containers, now completely empty of plasma, fall by the force of gravity into a funnel for supplying a used-container crusher. Once the containers have fallen into the funnel for supplying the used-container crusher, the shaft, together with the plurality of support rods thereof, rotates until it returns to the first position.

Preferably, the dripper moves from the holding position to the ejecting position by rotating. The rotation for moving from the first position to the second position occurs through the upper plane of the shaft such that the bottles are prevented from accidentally falling into the funnel for collecting blood product.

In one embodiment of the invention, the automated container-emptying device comprises sensors for detecting the position of the dripper. Preferably, said sensors are located in the rotary module. Said sensors form part of means for coordinating the dripper with the means for collecting and gravity-emptying containers.

In an advantageous embodiment of the invention, said coordination means are responsible for ensuring that the dripper is in the position for holding the containers upside down, allowing the product to drip onto the collection zone, when the means for collecting and gravity-emptying containers are in a position for collecting a subsequent plurality of containers to be emptied. Said coordination means are also responsible for ensuring that the dripper is in the container-ejecting position when the means for collecting and gravity-emptying containers are in a position for inverting the containers in the product collection zone. The above-mentioned coordination means are also responsible for returning the dripper to the container-holding position, when the means for collecting and gravity-emptying containers have finished inverting the containers, such that the collecting and gravity-emptying means can leave the containers to drain on the respective support elements thereof.

In one embodiment of the invention, all the components that may come into contact with the blood product are made of materials suitable for medical use. Preferably, all the metal components that may come into contact with the blood product are made of stainless steel suitable for medical use.

In this document, the terms "blood product container" and "blood product bottle" are equivalent and are used interchangeably. The term "blood product" may refer to raw blood, blood plasma or other products derived from blood. The terms "robot" and "robotic arm" are equivalent. The term "automated device for emptying blood product containers" is equivalent to "automated container-emptying device equipped with means for collecting and gravity-emptying containers and comprising a product collection zone".

BRIEF DESCRIPTION OF THE DRAWING

To aid understanding, explanatory yet non-limiting drawings are appended which show an embodiment of the automated device for emptying blood product containers according to the present invention.

DETAILED DESCRIPTION

Figure 1:
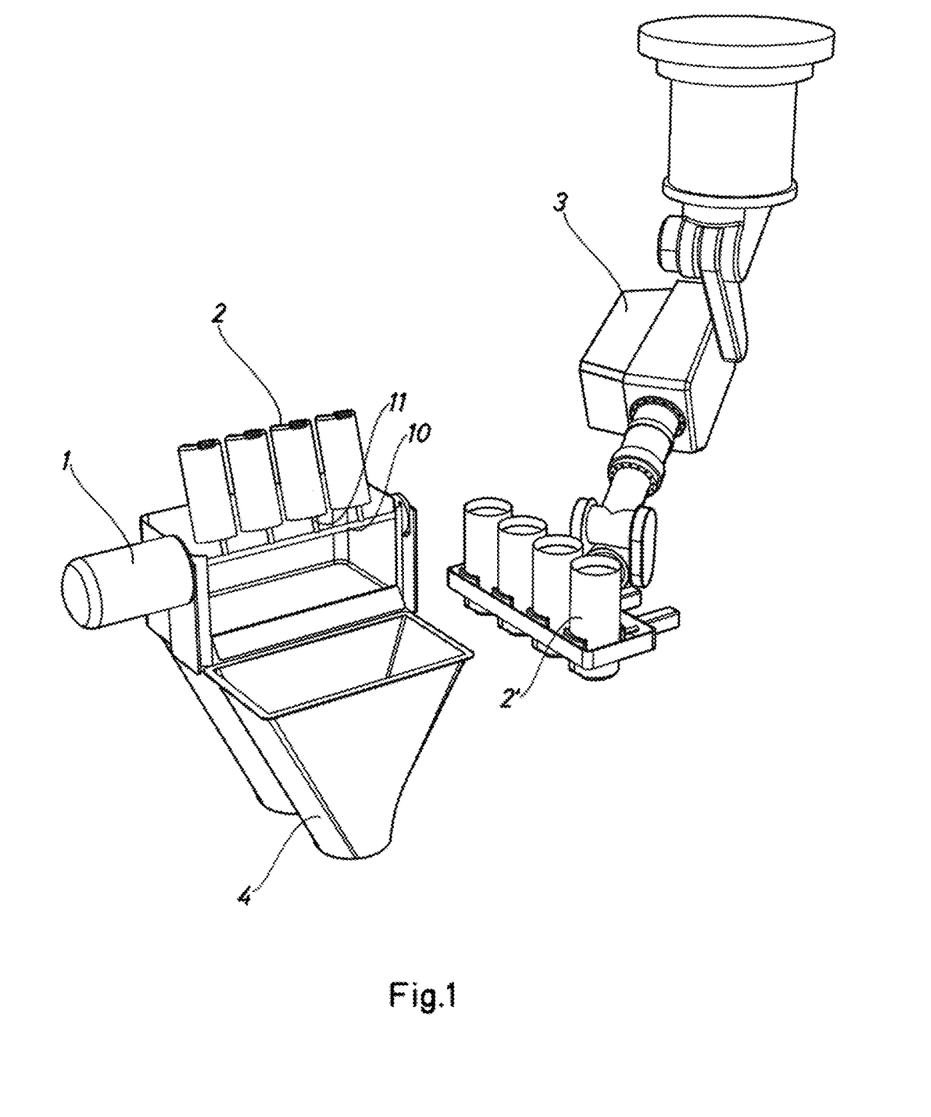
FIG. 1 is a perspective view of the automated device for emptying blood product containers in its entirety.

FIG. 1 shows that while a plurality of containers -2- are upside down in the dripper -1- and draining into the product-collecting funnel, the robot -3- is holding a second plurality of containers -2'- still full of blood product. This figure shows the dripper -1- support in the container-holding position.

Figure 2:
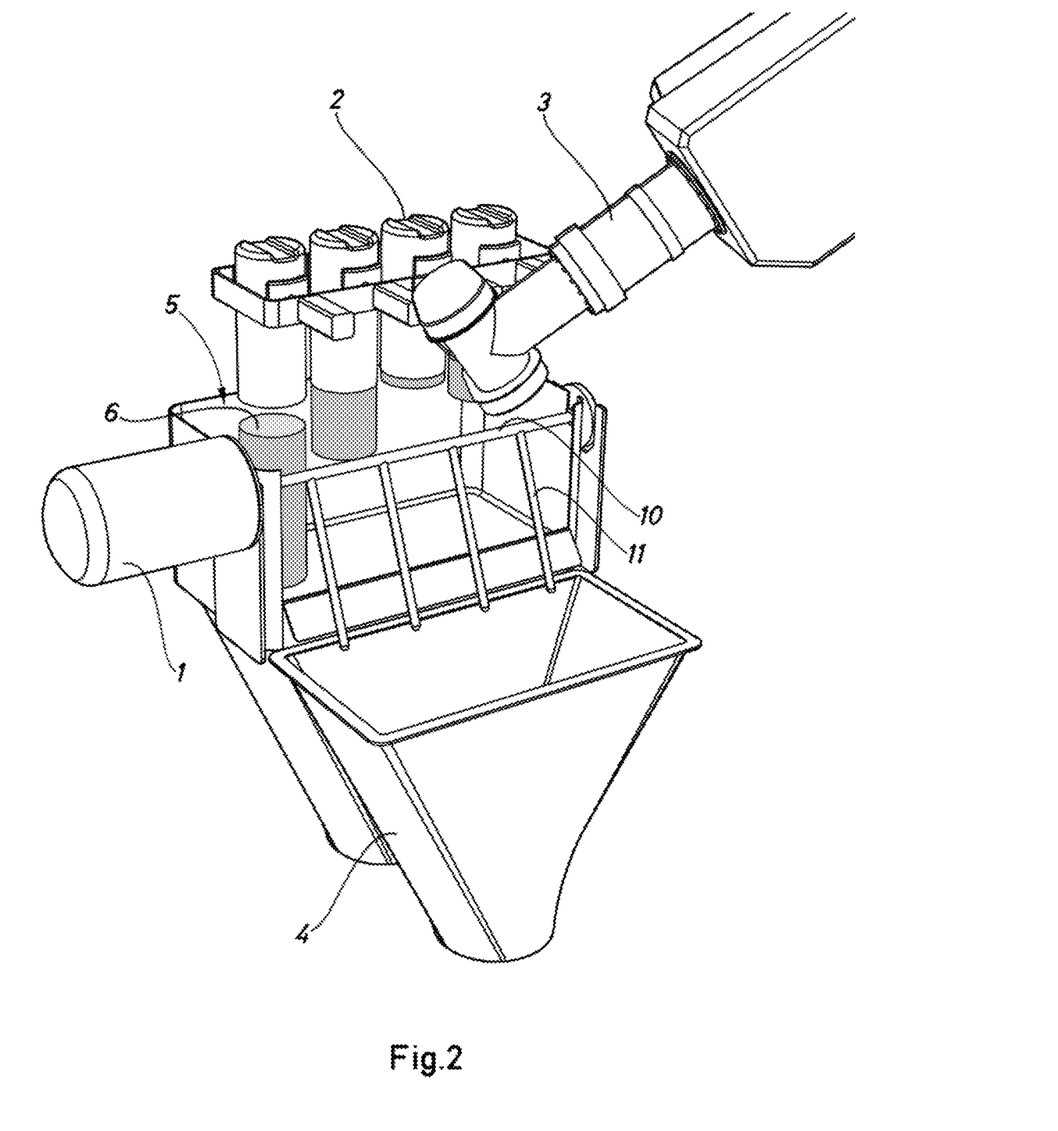
FIG. 2 is a perspective view of the front portion of the robot emptying the blood product containers.
Figure 3:
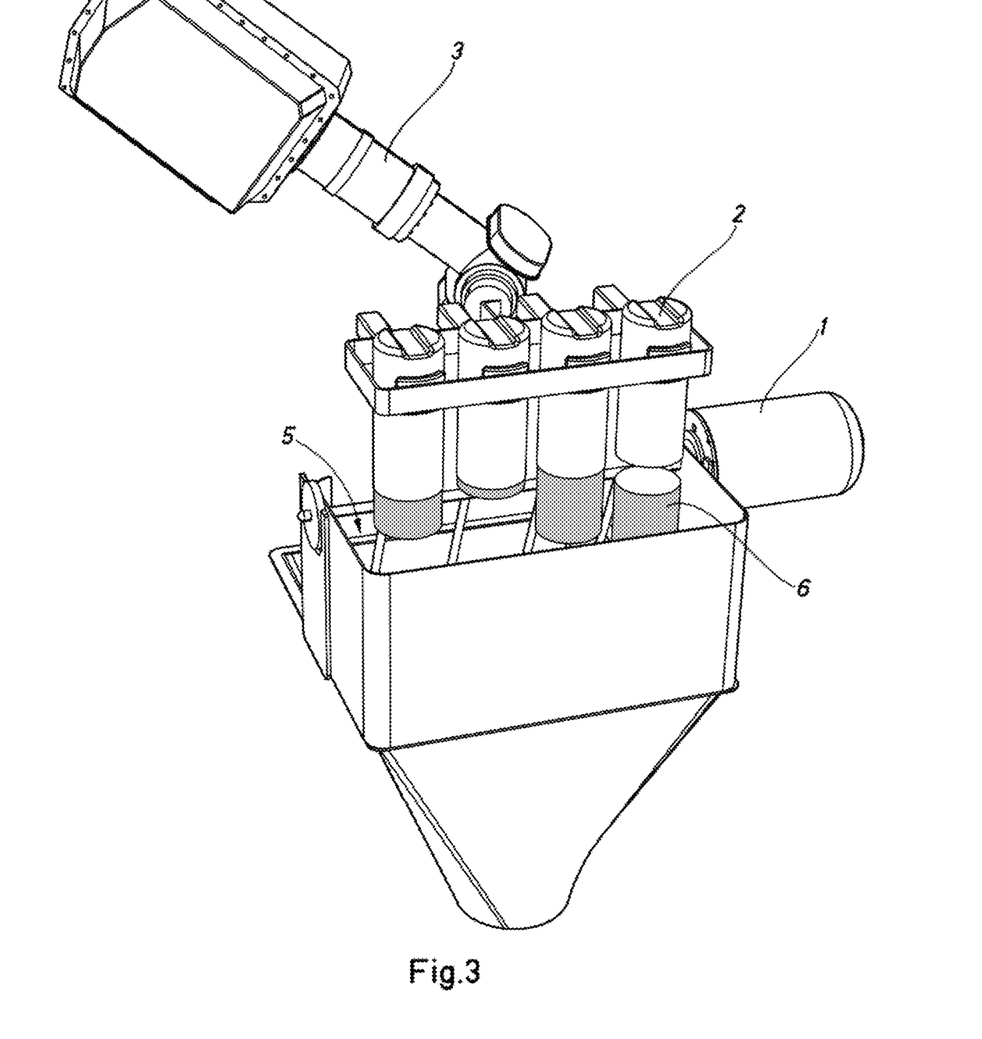
FIG. 3 is a perspective view of the rear portion of the robot emptying the blood product containers.

FIGS. 2 and 3 show the robot -3- inverting the plurality of containers -2- above the product-collecting funnel -5- and show the frozen plasma -6- of the containers -2- falling, by the force of gravity, into the product-collecting funnel -5-. Both figures show that while the robotic arm -3- inverts the containers -2-, the dripper -1- is in the container-ejecting position. FIG. 2 also shows the funnel -4- for supplying the used-container crusher, into which the containers, completely empty, fall when they are ejected from the dripper -1-.

Figure 4:
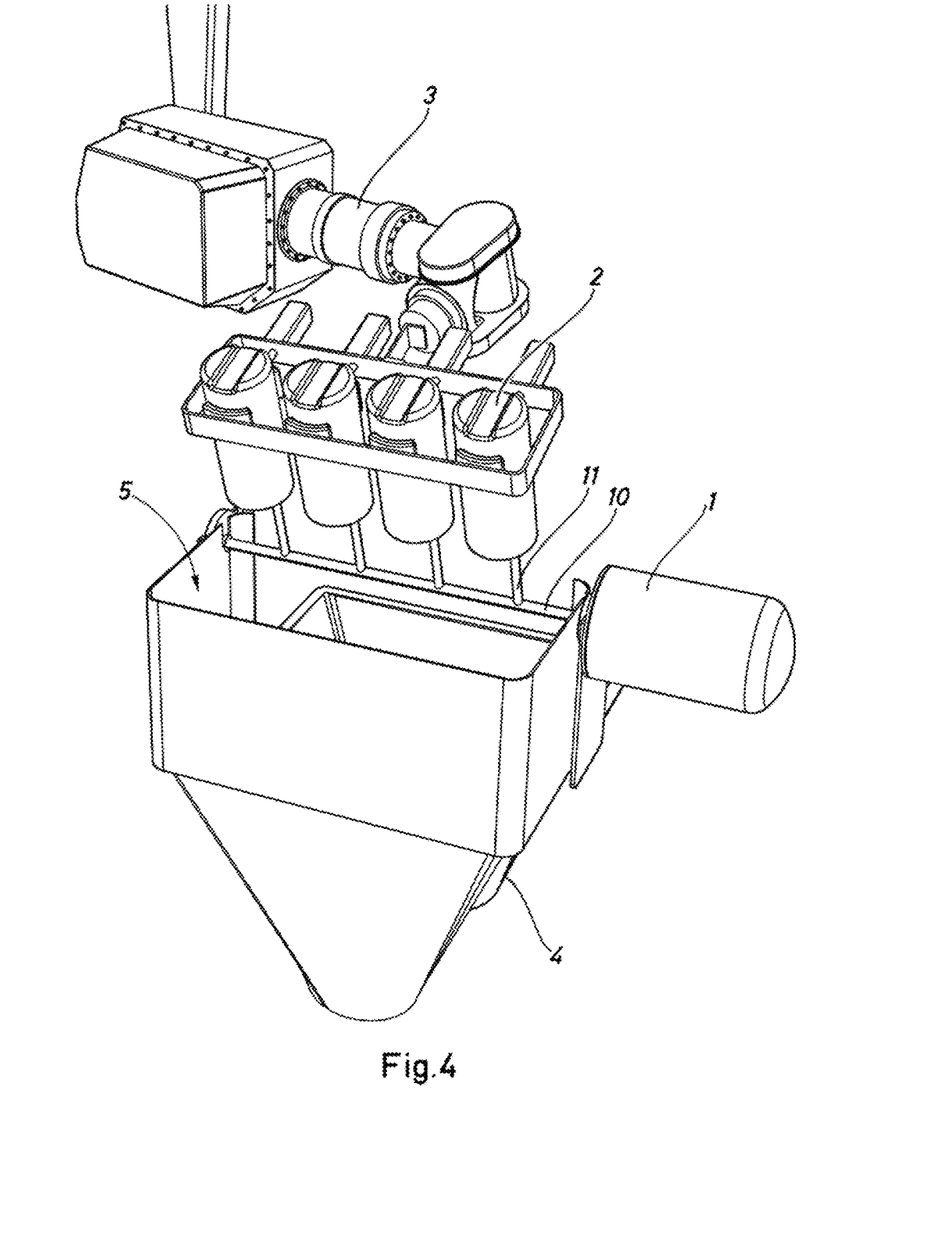
FIG. 4 is a perspective view of the robot placing the containers on the corresponding support rods of the dripper.

FIG. 4 shows that once the robot -3- has finished inverting the bottles -2-, the dripper -1- has moved into the container-holding position. This allows the robot -3- to place the bottles -2- onto the respective support rods -11- thereof once the robot -3- has inverted the containers above the product-collecting funnel -5-, such that the contents of the bottles -2- drain into the product-collecting funnel -5-.

In the container-holding position (FIGS. 1 and 4), the plurality of support rods -11- are slightly inclined with respect to the vertical towards the product-collecting funnel -5-. In the container-ejecting position (FIGS. 2 and 3), the plurality of support rods -11- is inclined such that the containers -2-, already empty, fall by the force of gravity into the funnel -4- for supplying the used-container crusher.

In order to move from the container-ejecting position (FIGS. 2 and 3) to the container-holding position (FIGS. 1 and 4) and vice versa, the longitudinal shaft -10-, and in turn the plurality of support rods -11- rigidly connected thereto, rotates. Said rotation occurs through the upper plane of the shaft -10-, such that the bottles -2- are prevented from accidentally falling into the funnel -5- for collecting blood product.

Figure 5:
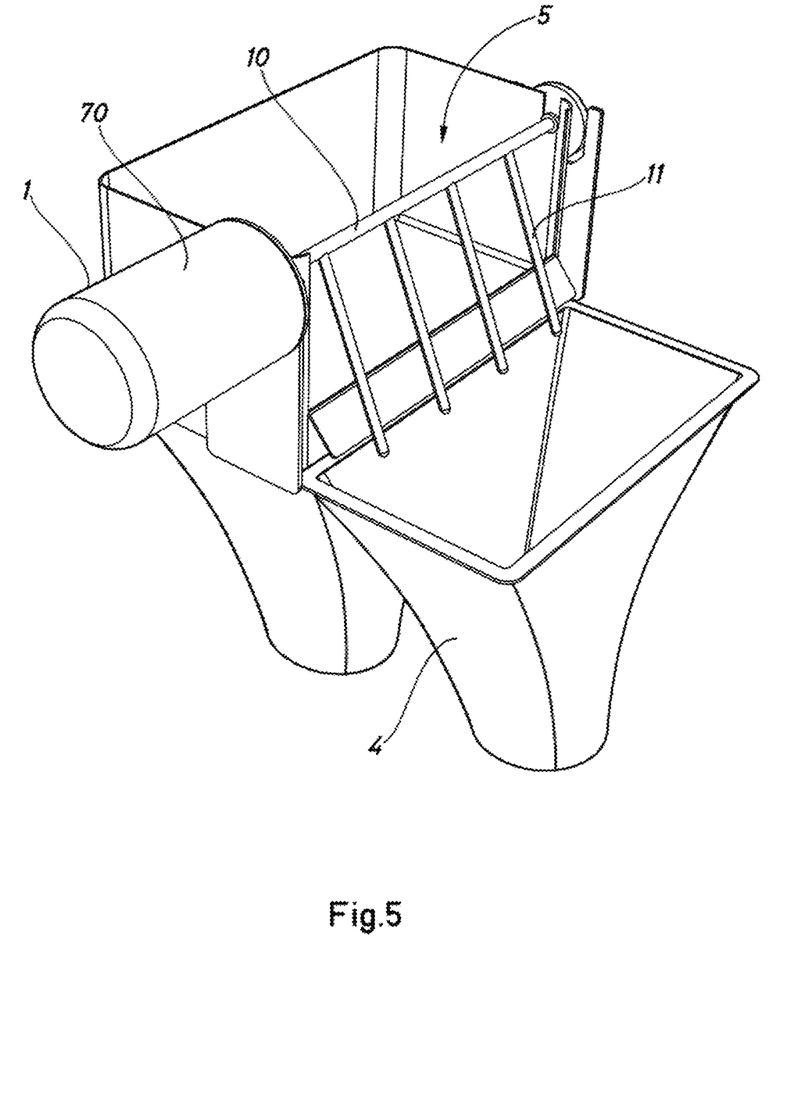
FIG. 5 is a perspective view of the dripper immediately after ejecting the empty containers.

FIG. 5 shows in detail the set which, in this embodiment of the invention, is formed of the dripper -1-, the product-collecting funnel -5- and the funnel -4- for supplying the used-container crusher. This figure shows the dripper in the container-ejecting position. In said position, the longitudinal shaft -10- has rotated by actuation by a rotary module (not shown) until it reached a position in which the support rods -11- form an angle that allows the empty bottles to fall, by the force of gravity, into the funnel -4- for supplying the used-container crusher. The rotary module (not shown), which causes the longitudinal shaft -10- and the plurality of support rods -11- thereof to rotate, is housed inside the cylindrical housing -70-.

Figure 6:
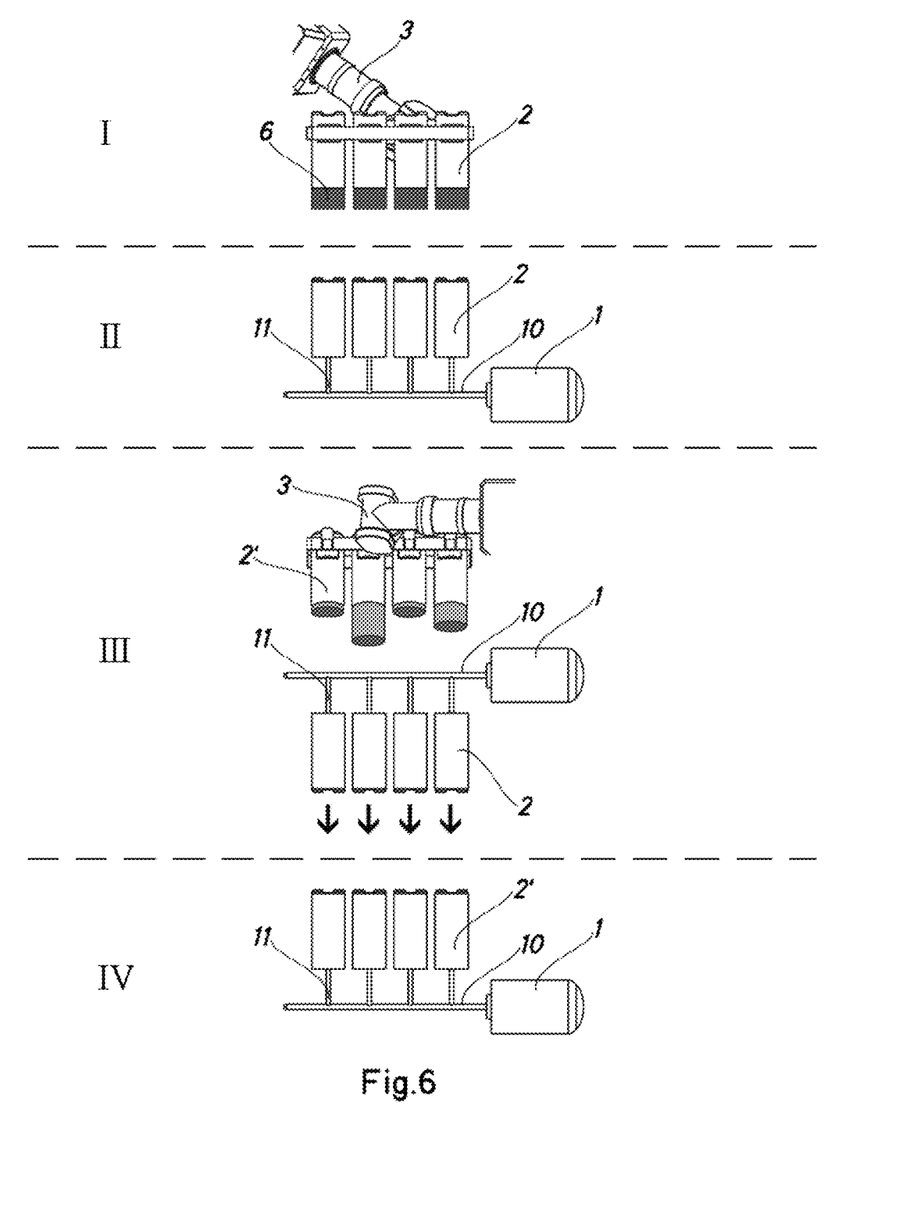
FIG. 6 shows the operating cycle of the automated device for emptying blood product containers.

FIG. 6 is an overview of the main phases of the operating cycle of the automated device for emptying blood product containers. As can be seen, the first phase -I- starts with the robotic arm -3- inverting the plurality of containers -2- such that the frozen blood product -6- falls by the force of gravity.

In the second phase -II-, the robotic arm has left the plurality of containers -2- on the corresponding plurality of support rods -11- such that the blood product residue still inside the containers is drained out into the product-collecting funnel (not shown in this figure).

In the third phase -III-, the dripper -1- moves into the container-ejecting position and the plurality of containers -2- that were draining fall into the funnel for supplying the used-container crusher (not shown in this figure). While the dripper -1- ejects the plurality of containers -2-, the robotic arm -3- inverts the subsequent batch of containers -2'-.

In the fourth phase -IV-, once the dripper -1- has ejected the containers -2- of the previous batch, said dripper -1- returns to the container-holding position so that the robotic arm leaves the plurality of containers -2'- of the current batch on the corresponding plurality of support rods -11- thereof such that the blood product drains into the product-collecting funnel (not shown in this figure).

The operating cycle of the automated device for emptying blood product containers shown in FIG. 6 is repeated in a cyclical and uninterrupted manner.

Figure 7:
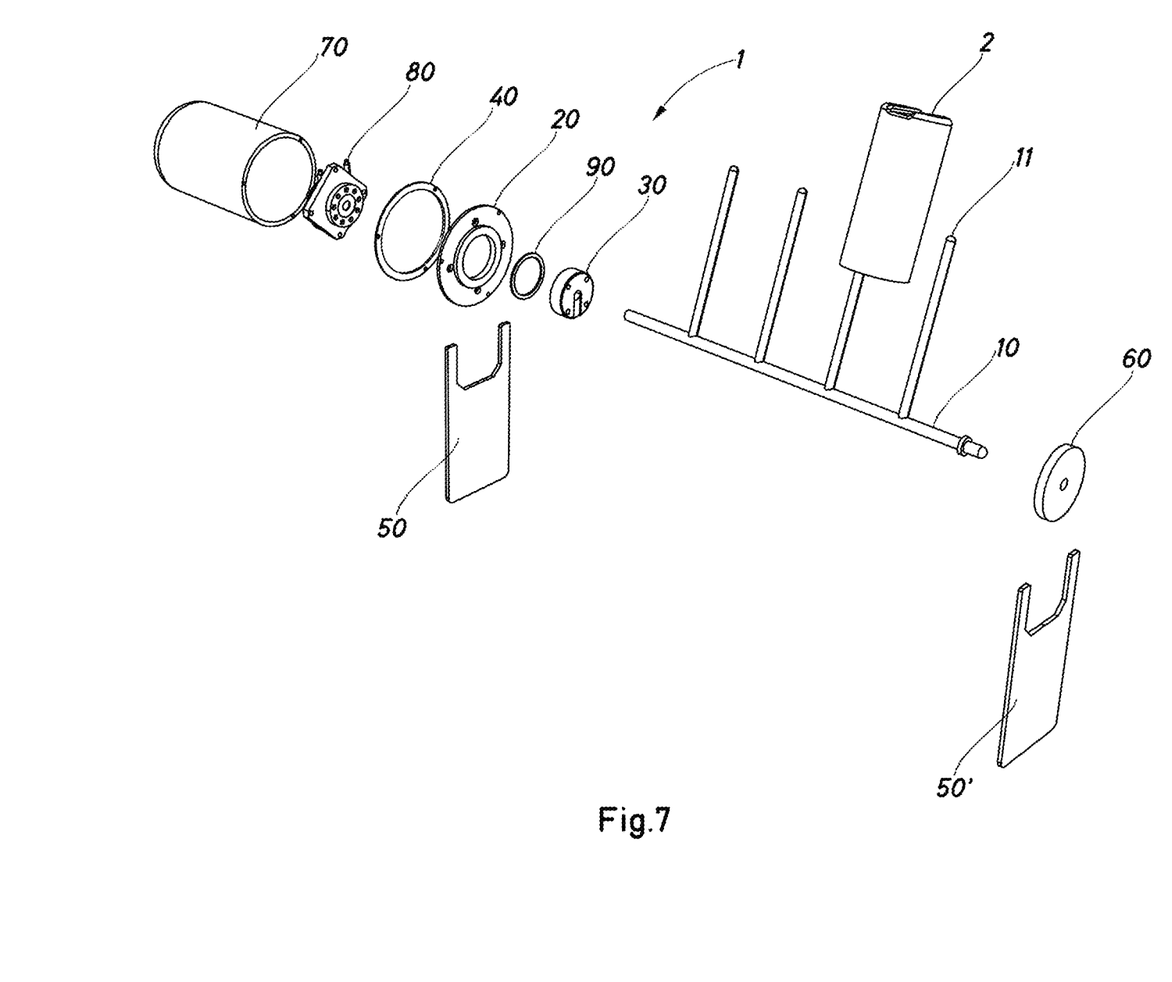
FIG. 7 is an exploded perspective view of the dripper.

FIG. 7 is an exploded perspective view of all the components that make up the dripper -1-. For illustrative purposes only, a bottle -2- held by one of the support rods -11- rigidly connected to the longitudinal shaft -10- is shown. As can be seen in this figure, on one of its ends, the shaft -10- is housed in a pivot bush -60-, and the other end of the shaft -10- is housed in a circular actuation plate -30-. Said circular actuation plate -30- is responsible for transmitting the movement of the rotary module -80- to the longitudinal shaft -10-. The circular actuation plate -30- is housed inside a circular disc -20-. A scraper -90- is positioned between the circular plate -30- and the hole of the disc -20- in which said plate is housed, which scraper is responsible for preventing the blood product from coming into contact with the rotary module -80-. Said circular disc -20- and the pivot bush -60- each fit into the corresponding support plate -50, 50'- thereof. Said support plates -50, 50'- are responsible for supporting the dripper -1- and all the components making up same.

As can be seen in FIG. 7, the rotary module -80-, which is responsible for causing the longitudinal shaft -10- and the plurality of support rods -11- thereof to rotate, is housed inside a cylindrical housing -70-. Said cylindrical housing -70- is connected to the disc -20- by non-permanent connection means (not shown). A bush -40- made of teflon is positioned between the cylindrical housing -70- and the disc -20- and is responsible for making the closure liquid-tight.

Figure 8:
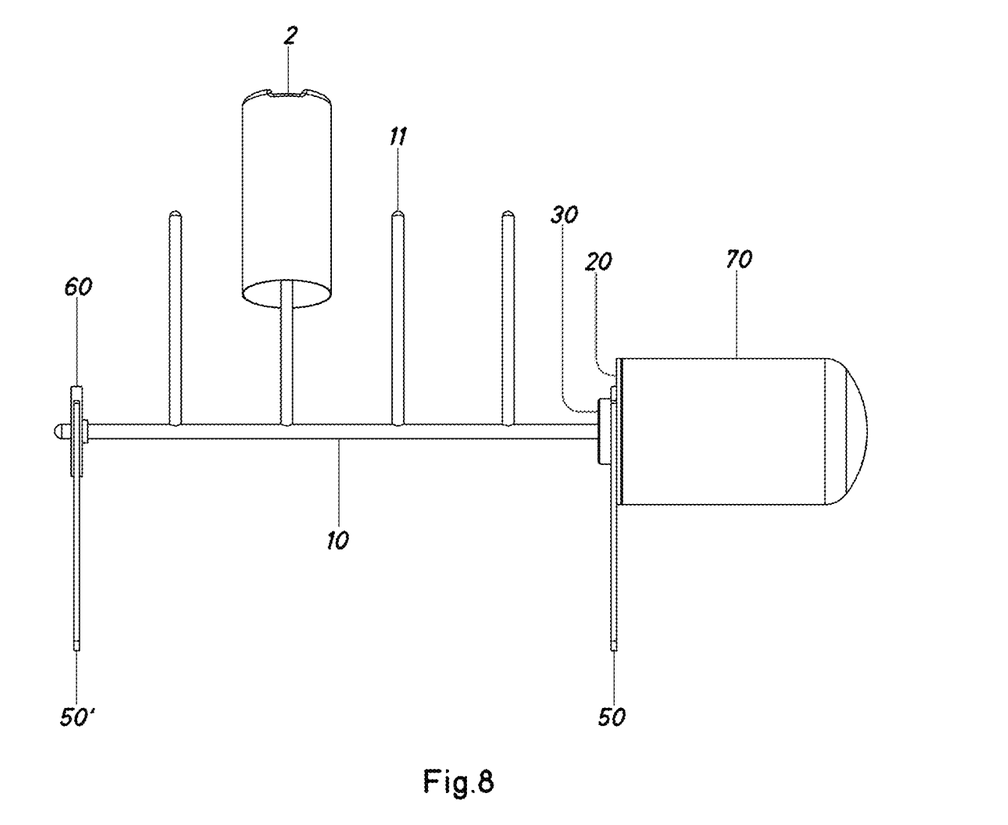
FIG. 8 is a front elevation view of the dripper in the container-holding position.

FIG. 8 shows the dripper -1- when fully assembled. As can be seen by the position of the support rods -11-, in this figure the dripper -1- is in the container-holding position.

Figure 9:
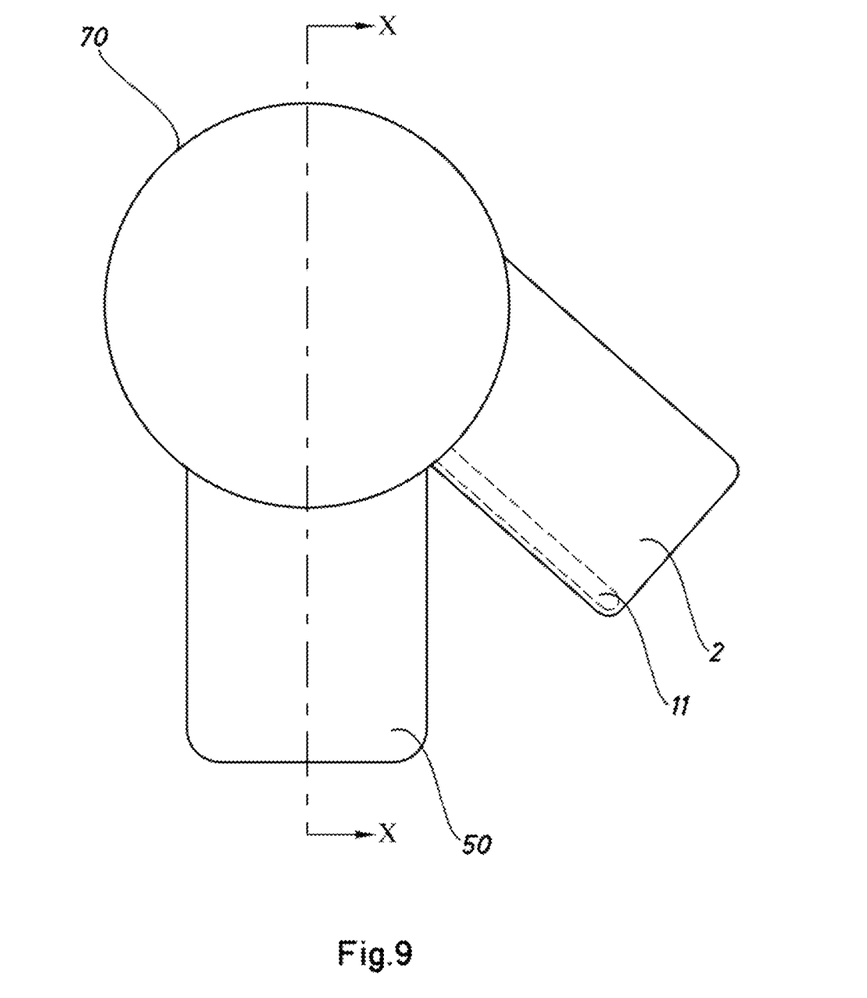
FIG. 9 is a side elevation view of the dripper in the container-ejecting position.

FIG. 9 shows the dripper -1- in the container-ejecting position. In said position, the support rods -11- form an angle relative to the vertical such that the bottle -2- falls, by the force of gravity, into the funnel for supplying the used-container crusher (not shown).

Figure 10:
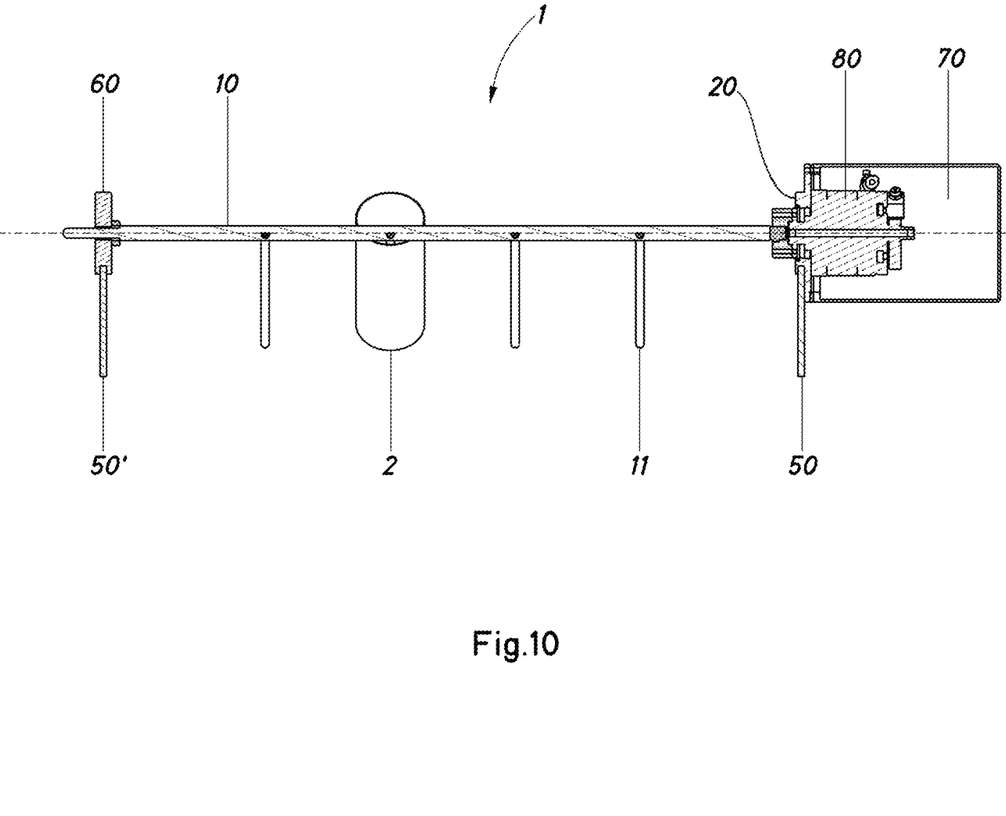
FIG. 10 is a sectional front elevation view along the cut line X-X from FIG. 9.

FIG. 10 is a sectional front elevation view along the cut line X-X from FIG. 9. This figure shows in detail how the various components that make up the dripper -1- are assembled. In this figure, the dripper -1- is in the ejecting position.

Figure 11:
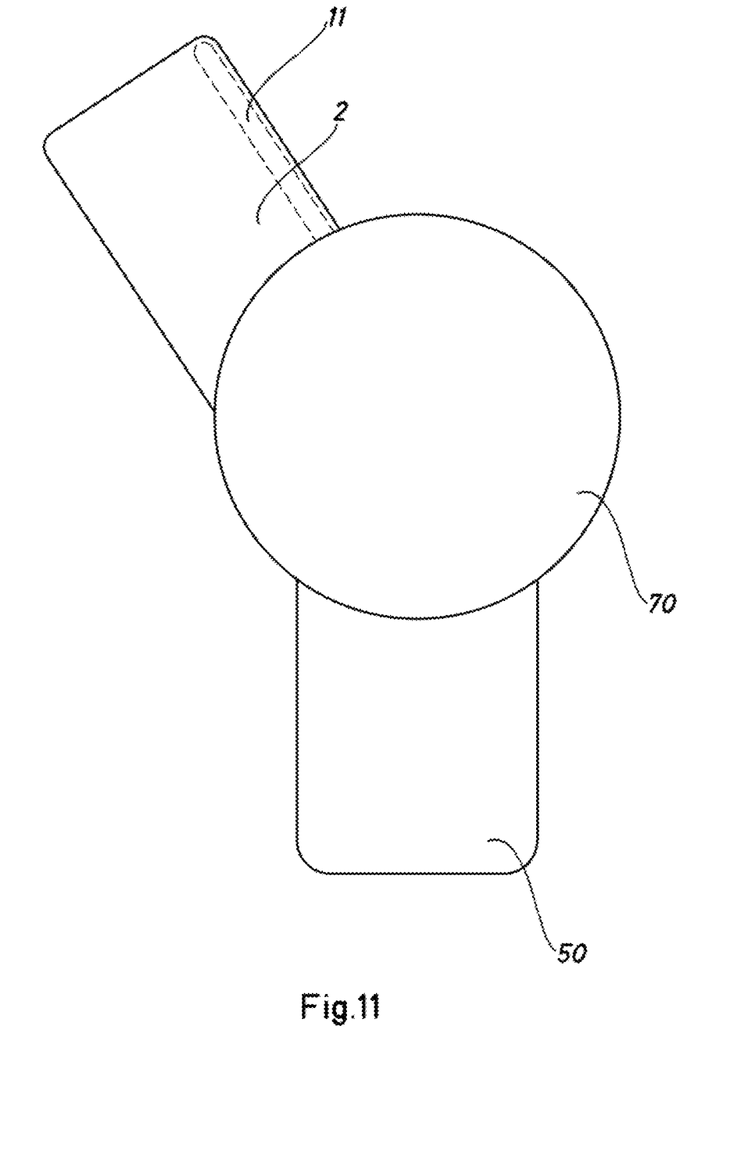
FIG. 11 is a side elevation view of the dripper in the container-holding position.

FIG. 11 shows that when the dripper -1- is in the holding position, the bottles -2- are held upside down by the support rods -11- such that any product residue that remains in the bottle -2- is drained out into the product-collecting funnel (not shown).

Although the invention has been described and shown based on a representative example, it should be understood that said exemplary embodiment in no way limits the present invention, and as such any of the variations that are included directly or by way of equivalence in the contents of the accompanying claims should be considered to fall within the scope of the present invention.

What is claimed is:

1. An automated container-emptying device configured to collect and empty containers by gravity, and comprising a product collection zone,
    wherein the device further comprises a dripper equipped with at least one support supporting one or more upside down containers,
    wherein the dripper has two operating positions: a holding position for holding the containers to allow the product to drip onto the product collection zone and an ejecting position for ejecting said containers,
    wherein the ejecting position of the dripper is such that used containers are caused to fall, by gravity, into a funnel for collecting the used containers.

2. The device according to claim 1, wherein, in the holding position, the at least one support is pointing upwards from a horizontal shaft of the dripper.

3. The device according to claim 1, wherein the at least one support is a rod.

4. The device according to claim 1, wherein the dripper is configured to move from the holding position to the ejecting position by rotating.

5. The device according to claim 1, wherein the dripper is configured to be actuated by a rotary motion.

6. The device according to claim 5, wherein said rotary motion is configured to be actuated by a pneumatic actuator.

7. An automated container-emptying device configured to collect and empty containers by gravity, and comprising a product collection zone,
    wherein the device further comprises a dripper equipped with at least one support supporting one or more upside down containers,
    wherein the dripper has two operating positions: a holding position for holding the containers to allow the product to drip onto the product collection zone and an ejecting position for ejecting said containers,
    wherein the device comprises a robotic arm to collect and empty the containers by gravity.

8. The device according to claim 1, wherein said device is an automated device for emptying blood product.

9. The device according to claim 8, wherein said device is an automated device for emptying frozen product.

10. The device according to claim 1, wherein said containers are bottles.

11. The device according to claim 1, wherein said device comprises sensors for detecting the position of the dripper.

12. The device according to claim 7, wherein the dripper is coordinated with the robotic arm.

13. The device according to claim 12, wherein the device is configured such that,
    when the robotic arm is in a position for collecting a subsequent plurality of containers to be emptied, the dripper is in the position for holding containers upside down, allowing the product to drip onto the collection zone;
    when the robotic arm is in the position for inverting containers in the product collection zone, the dripper is in the ejecting position; and
    when the robotic arm has finished inverting containers, the dripper returns to the holding position so that the robotic arm can leave said containers to drain on the at least one support.

14. The device according to claim 1, further comprising metal components, wherein the metal components are made of stainless steel suitable for medical use.

15. The device according to claim 1, wherein the device comprises a plurality of said supports, each configured to support a single upside down container.

* * * * *